United States Patent                              [11] 3,592,531

| [72] | Inventor | George L. McCrobie |
|---|---|---|
| | | Rochester, N.Y. |
| [21] | Appl. No. | 23,048 |
| [22] | Filed | Mar. 26, 1970 |
| [45] | Patented | July 13, 1971 |
| [73] | Assignee | Xerox Corporation |
| | | Rochester, N.Y. |
| | | Continuation-in-part of application Ser. No. 856,730, Sept. 10, 1969, now abandoned. |

[54] SPLIT DAGOR-TYPE OF SYMMETRICAL COPYING LENS SYSTEM
7 Claims, 5 Drawing Figs.

| [52] | U.S. Cl. | 350/220 |
|---|---|---|
| [51] | Int. Cl. | G02b 9/34 |
| [50] | Field of Search | 350/220 |

[56] References Cited
UNITED STATES PATENTS
3,418,038   12/1968   Buchroeder et al. ......... 350/202

*Primary Examiner*—David Schonberg
*Assistant Examiner*—Paul A. Sacher
*Attorneys*—Paul M. Enlow, James J. Ralabate, Donald F. Daley and Clarence A. Green ABSTRACT: A Split Dagor-type of symmetrical copying lens system having front and back compound lens components with a centrally located diaphragm therebetween adapted to an optical system of a copier which can be used at both 1:1 and 1:1.6 magnifications, and all magnifications therebetween. The front lens component has three lens elements including, in the following order, a first lens element of positive power, a second lens element of negative power cemented to the first lens element and a third lens element of positive power disposed between the second lens element and diaphragm, and the back lens component having three similar lens elements positioned so that the lens system is symmetrical.

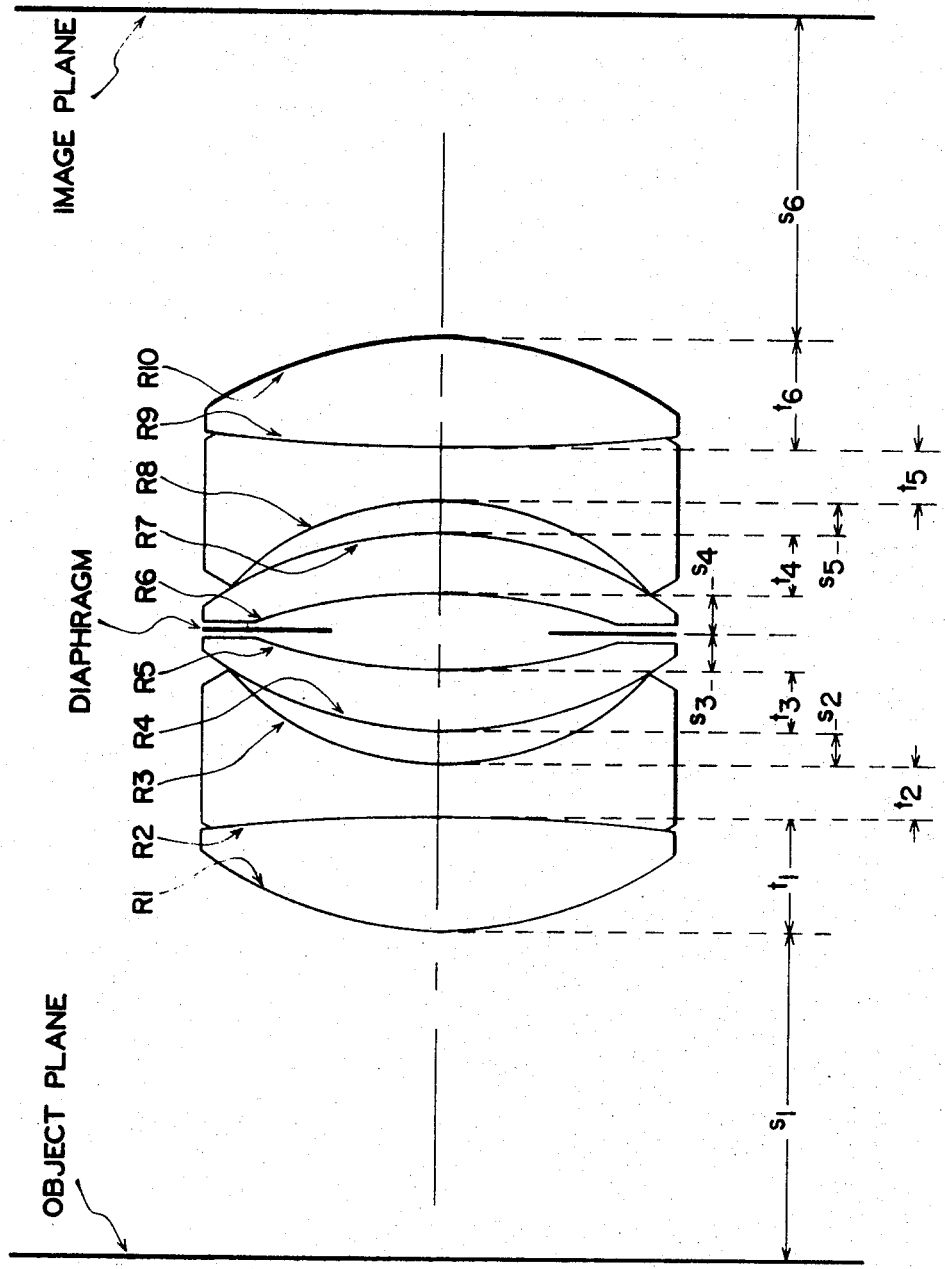

SPLIT DAGOR-TYPE OF SYMMETRICAL COPYING LENS SYSTEM

BACKGROUND OF THE INVENTION

This application is a continuation-in-part of applicant's prior copending application, Ser. No. 856,730, filed Sept. 10, 1969 and now abandoned.

The present invention relates to Split Dagor type of symmetrical lens system and, more particularly, to a lens system which is particularly suited to a copier optical system which operates at various object-to-image distances while faithfully reproduces color information at various magnifications.

In reproduction systems wherein light patterns of original information is projected onto a photosensitive member to form a copy of the information on the member, a lens system is required which focuses the light pattern on the member to reproduce sharp, clear images. The characteristics of prior art lens systems for copiers such as the size of field angle that can be tolerated, degree of resolution and other rating factors are to a large extent dependent on the speed, or $f$-number of the lens system. As a general matter, it is known that as the $f$-number decreases, the overall performance of a copier lens system declines noticeably if the field angle remains constant. As a result, the lens systems used in the present copiers maintain $f$-numbers in the range of $f(6.3)$ to $f(11.0)$ to assure good resolution at reasonable field angles and over a wide spectral range to form images of adequate quality for the copier environment.

With the advent of color copying systems wherein wavelengths of light throughout the visible spectrum pass through the lens system, another problem involving chromatic aberration called secondary color arises with prior art lens systems. In this situation light rays of different wavelengths in the same ray bundle are displaced a small distance from one another upon reaching the image plane. This displacement causes an obvious depreciation in the image being formed especially when reproducing color originals if the displacement is allowed to reach proportions discernable by the eye. In addition, many optical systems used in copiers are required to form enlarged images as well as an image which is the same size as the original information. This can be accomplished by using a first lens system to copy at 1:1 magnification and a second lens system to form an enlarged image, the particular lens system desired at any given time being selectively positioned between the object and image planes to the exclusion of the other. However, the use of two separate lens systems to obtain two different magnifications is very expensive as well as mechanically awkward to manufacture and align. In the alternative, a single lens system can be designed to function at several magnifications, but such prior art lens systems sacrifice image quality to achieve such flexibility and are of little value in a high quality and light limited reproduction systems.

The lens system disclosed herein maintains high performance characteristics at a field angle in the order of 31° and good color fidelity at speeds as high as $f(4.5)$. In addition, the lens system is adapted to produce high quality images in the copier environment at both 1:1 and 1:1.6 magnifications and all magnification ratios therebetween.

Accordingly, it is an object of the present invention to improve the design of Split Dagor-type lens systems.

It is a further object of the present invention to improve lens systems employed in copiers.

It is a further object of the present invention to improve the quality of images formed by lens systems which operate at a field angle in the order of 31° and at speeds of $f(4.5)$.

It is a further object of the present invention to improve the quality of color images formed from wavelengths of light between 3,900 and 6,500 angstroms.

It is a further object of the present invention to improve the quality of images formed by a Split Dagor-type lens system at both 1:1 and 1:1.6 magnifications and all magnification ratios therebetween.

It is a further object of the present invention to improve the design of a Split Dagor-type lens system so that it can be easily manufactured and assembled.

SUMMARY

The invention described herein is a Split Dagor-type lens system having front and back compound lens components with a centrally located diaphragm therebetween. The lens system forms high-quality images with the field angle of 31° and a speed of $f(4.5)$ at both 1:1 and 1:1.6 magnifications, and minimizes the effect of secondary color at the image plane.

The front lens component has three lens elements including, in the following order, a first lens element of positive power, and a second lens element of negative power cemented to the first lens element, and a third lens element of positive power disposed between the second lens element and diaphragm, and back lens component having three similar lens elements positioned so that the lens system is symmetrical. In a specific embodiment of the lens, the first lens element in the front component is a double convex lens, the second lens element a double concave lens, and the third lens element a convex-concave lens element.

BRIEF DESCRIPTION OF THE DRAWINGS

For a better understanding of the invention as well as other objects and further features thereof, reference is had to the following detailed description to be used in conjunction with the accompanying drawings wherein:

FIG. 1 is a schematic illustration of the invention.

DESCRIPTION OF THE PREFERRED EMBODIMENTS

Figure 2A:
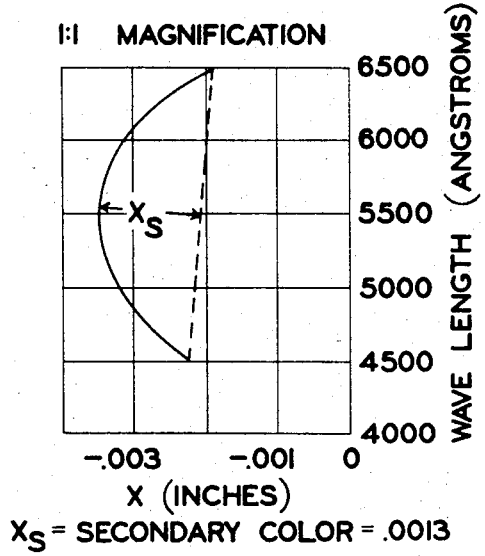
FIG. 2A-D are graphic representations of the effect of secondary color.

Referring to the FIG., a Split Dagor-type lens system is shown between object and image planes. The lens system includes two compound lens components of three lens elements each having a diaphragm located therebetween. The lens system has a front portion between the object plane and diaphragm and a back portion between the diaphragm and image plane, the six lens elements being located so that the entire lens system is symmetrical about the diaphragm.

The front portion of the system includes lens element I which is a positive power lens, lens element II which is a negative power lens, and lens element III which is a positive power lens. Lenses I and II are cemented together with any suitable transparent optical cement such as one of the cements made for this purpose by Eastman Kodak Company, Rochester, New York. Preferably, the cement should have an index of refraction which closely approximates that of lenses I and II. Lens III, the closest one to the diaphragm, is separated from lens II by an air gap.

Any known optical glass can be used which is suitable for the lens system shown. For example, Dense Barium Crown-type (SK-18), Light Flint-type (LF-1, LF-6), and Barium Flint-type (BAF-9) glass made by Schott Optical Glass Company, Duryea, Pa. are suitable for the lens elements, to name just a few. The lens elements in the back portion of the lens system which include lenses IV, V, and VI are of the same general configuration as lenses III, II and I, respectively, arranged in a complementary manner to the front portion of lens system in order to achieve a symmetrical lens system.

As a result of lens elements I and II and lens elements V and VI being cemented together, the system is simpler to manufacture and assemble with precision than it would be if designed with an air gap between these lens elements. The undesirable buildup of tolerances common to a lens system having multiple lens elements separated by air gaps is also less of a problem in the present design, since two air gaps are eliminated.

In addition to cementing certain lens elements together, a mechanical advantage results in maintaining edge contact between lenses II and III and lenses IV and V. Air spaces $S_2$ and $S_3$ are very sensitive areas for tolerance deviation. If these air spaces are not held to close tolerances during manufacture and assembly, the tangential field curvature is affected drastically. Since the sags of the lenses, that is, the distance along the optical axis from the vertex of the lens to a plane connecting the clear aperture or the edge of the lens, can be held to rigid tolerances more easily than a spacer located between the two lenses, closer tolerance control can be maintained over the air space dimension. Such edge contact results in lower production costs as well as a better yield of usable lenses during manufacturing.

The figure shows the front portion of the lens system as including lens I which is shown as a double convex lens, lens II which is shown as a double concave lens and lens III which is shown as a convex-concave lens. The specific sizes, shapes, and radii of the individual lens are only shown illustratively in the figure and are not necessarily intended to be presented to scale. For instance, lens I could be a convex-concave lens as long as its power remains positive. Similar changes could be made in the other lens elements of the system and the same is true of the back portion lens elements.

Figure 2B:
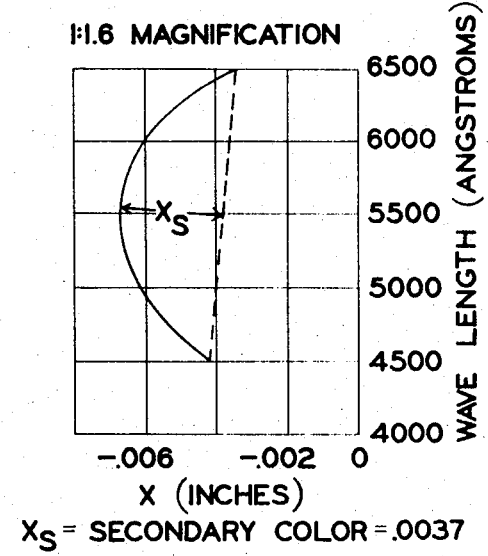
Figure 2C:
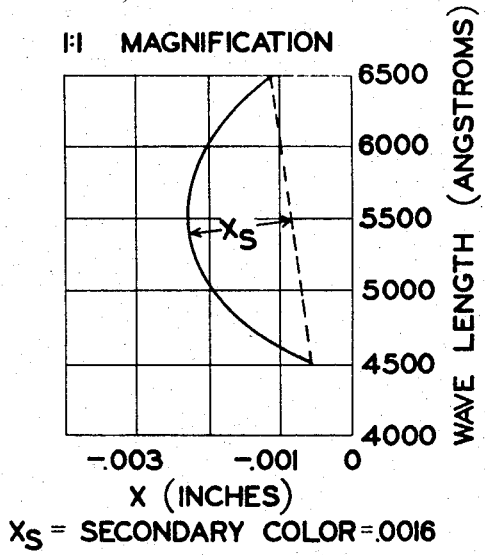
Figure 2D:
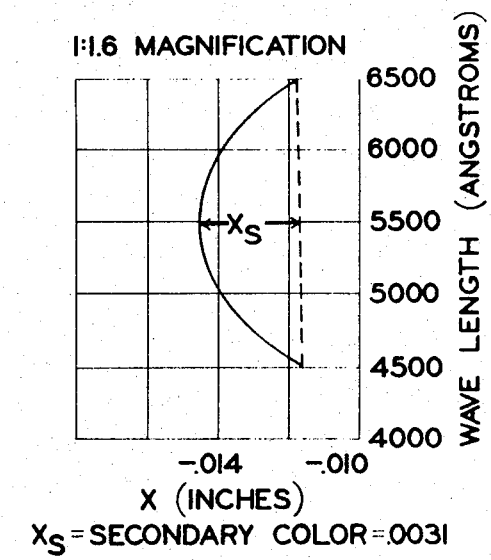

The design of the present system is such that it is readily adaptable to color copying systems since the design reduces the effect of chromatic aberration known as secondary color. FIGS. 2A—D are graphic representations of the effect of secondary color of the lens system disclosed herein. In all of these graphs the y-axis represents the wavelengths of the light in angstroms plotted between 4,500 and 6,500 angstroms in all cases. The x-axis of the graphs in FIGS. 2A and 2B is the actual height of the 0.7 aperture axial upper ray at the paraxial image plane determined by a paraxial ray traced in primary (5,500 angstroms) light in inches which the x-axis in FIGS. 2C and 2D is the actual height of 0.7 aperture of the full object upper tangential ray with respect to the full object chief ray in inches. The chief ray is defined as the ray from the full field object position which passes through the center of the aperture stop or diaphragm. FIGS. 2A and 2C are taken at 1:1 magnification while FIGS. 2B and 2D are at 1:1.6 magnification. In all four graphs, the value x is a measure of the secondary color and is determinable in the graphs by the length of a line drawn from the primary wavelength point perpendicular to the line connecting the secondary and tertiary wavelength points. These measurements show that from the center of the image to the outer edge of the image the secondary color retains the same value, at both ends of the magnification range, to within 0.001 inch. The amount of secondary color, X, therefore, with the present lens system at both ends of the magnification range is low enough that there is very little image degradation due to this aberration. In addition to little secondary color effect, the lens system can be used at speeds as high as $f(4.5)$ in a copier environment with good results in a copier and is corrected for spherical aberration, coma, astigmatism, distortion, and field curvature.

The lens system can be used at two specific magnifications, 1:1 and 1:1.6, as well as all magnifications therebetween, with equally good performance characteristics. The lens system is placed approximately at the midpoint between the image and object planes which operated at a 1:1 magnification. Then, when 1:1.6 magnification is desired, the same lens system is moved closer to the object plane and the image plane moves away from the object plane to distances which are set out below in table III. As a result of the reliable quality of the image produced by the lens at both settings, the same lens can be used for both magnifications required by the copier by merely shifting the lens system and image plane relative to the object plane.

The parameters of the lens system are based on measurements taken on the system as shown in the FIG. The symbol S generally refers to the length of air spaces between elements in the system and the term T refers to thickness of lens elements, both distances being measured in inches along the center line of the lens system. Referring to FIG. 1, $S_1$ is the distance between the object plane and lens element I, $S_2$ the distance between the lens elements II and III, $S_3$ the distance between lens element III and the diaphragm opening, $S_4$ the distance between the diaphragm opening and lens element IV, $S_5$ the distance between the lens element IV and V, and $S_6$ the distance between lens element VI and the image plane. $T_1$ is the thickness of lens element I, $T_2$ the thickness of the lens element II, $T_3$ the thickness of the lens element III, $T_4$ the thickness of lens element IV, $T_5$ the thickness of lens element V and $T_6$ the thickness of lens element VI. In addition, lens element I has radii $R_1$ and $-R_2$, lens element II radii $-R_2$ and $R_3$, lens element III radii $R_4$ and $R_5$, lens element IV radii $-R_6$ and $R_7$, lens element V radii $-R_8$ and $R_9$ and lens element VI radii $R_9$ and $-R_{10}$. In the tables $R_1$ to $-R_{10}$ represent the successive lens surfaces formed on said lens element wherein the minus (−) sign applies to the curvatures whose centers lie on the short conjugate side of the respective surfaces.

The permissible tolerances for the radii and thicknesses of the lens elements and the spaces, in terms of the equivalent focal length F of the lens system, are set out in table I.

TABLE I

| | | |
|---|---|---|
| .0219F | $<S_2=S_5$ | $<.0223F$ |
| .0210F | $<S_3=S_4$ | $<.0226F$ |
| .0711F | $<T_1=T_6$ | $<.0721F$ |
| .0330F | $<T_2=T_5$ | $<.0342F$ |
| .0370F | $<T_3=T_4$ | $<.0381F$ |
| .2380F | $<R_1=-R_{10}$ | $<.2770F$ |
| 1.5500F | $<-R_2=R_9$ | $<1.7100F$ |
| .1810F | $<R_3=-R_8$ | $<.1930F$ |
| .2680F | $<R_4=-R_7$ | $<.2910F$ |
| .4040F | $<R_5=-R_6$ | $<.4180F$ |

In addition, the permissible tolerances for the absolute numerical values for refractive indexes $n_D$ and Abbe number $v$ of the optical material from which the lens elements I to VI are formed is set forth in table II.

TABLE II

| | | | |
|---|---|---|---|
| $1.636<N_d$ | $(I)=N_d$ | $(VI)<1.640$ | |
| $1.565<N_d$ | $(II)=N_d$ | $(V)<1.575$ | |
| $1.641<N_d$ | $(III)=N_d$ | $(IV)<1.645$ | |
| $54.700<v$ | $(I)=v$ | $(VI)<57.700$ | |
| $41.600<v$ | $(II)=v$ | $(V)<45.000$ | |
| $46.900<v$ | $(III)=v$ | $(IV)<50.000$ | |

With regard to the diaphragm, the axial distance thereof rearwardly from the vertex of the lens radius $R_6$ is substantially 0.186 F and the diameter of the opening at $f(4.5)$ is substantially 0.186 F for the two magnifications.

The object distance $S_1$ and the image distance $S_6$ of the symmetrical lens system is set out below in table III for the values of those distances at different magnifications.

TABLE III

| Magnification | $S_1$ | $S_6$ |
|---|---|---|
| 1:1 | 1.82F | 1.82F |
| 1:1.3 | 1.59F | 2.12F |
| 1:1.6 | 1.45F | 2.42F |

A chart of specific numerical values, in which all scale values are given in inches, is given below for the optical parameters of the invention, the symbolism used herein being the same as set forth in the foregoing description.

CHART I

[E.F.L.=10.0"  B.F.L.=8.234"  f(4.5)]

| Lens | Focal length | Radii | Thickness | Spaces | $N_d$ | $v$ |
|---|---|---|---|---|---|---|
| I | $F(I, IV)=3.629$ | $R_1=2.646$ | $T_1=.717$ | | 1.638 | 55.5 |
| II | | $-R_2=16.577$ | $T_2=.337$ | | 1.573 | 42.7 |
| | | $R_3=1.894$ | | $S_2=.221$ | | |
| III | $F(II, V)=2.946$ | $R_4=2.736$ | $T_3=.376$ | | 1.643 | 47.8 |
| | | $R_5=4.119$ | | $S_3=.217$ | | |
| | | | | $S_4=.217$ | | |
| IV | $F(III, IV)=11.448$ | $-R_6=4.119$ | $T_4=.376$ | | 1.643 | 47.8 |
| | | $-R_7=2.736$ | | $S_5=.221$ | | |
| V | | $-R_8=1.894$ | $T_5=.337$ | | 1.573 | 42.7 |
| VI | | $R_9=16.577$ | $T_6=.717$ | | 1.638 | 55.5 |
| | | $-R_{10}=2.646$ | | | | |

NOTE: All scalar values are given in inches.

An example of specific values used in the lens system described herein wherein the aperture is substantially $f(4.5)$, magnification is between 1X and 1.6X, and the front component has a focal length between 1.530F and 1.545F and the back component has a focal length between 1.530F and 1.545F, while F represents the equivalent focal length of the lens system, is set out in table IV.

TABLE IV $F(I, II) = F(V, VI) = -9.812F$
$F(III) = F(IV) = 1.1448F$
$S_2 = S_5 = .0221F$
$S_3 = S_4 = .0216F$
$T_1 = T_6 = .0716F$
$T_2 = T_5 = .0336F$
$T_3 = T_4 = .0376F$
$R_1 = -R_{10} = .2646F$
$-R_2 = R_9 = 1.6577F$
$R_3 = -R_8 = .1894F$
$R_4 = -R_7 = .2735F$
$R_5 = -R_6 = .4119F$
$N_d(I) = N_d(VI) = 1.638$
$N_d(II) = N_d(V) = 1.573$
$N_d(III) = N_d(IV) = 1.643$
$v(I) = v(VI) = 55.5$
$v(II) = v(V) = 42.7$
$v(III) = v(IV) = 47.8$ wherein the diameter opening at:
$f(4.5) = .196F$
$f(5.6) = .151F$
$f(8.0) = .105F$
$f(11.0) = .007F$ one another and the depth of focus is required to be maintained for all the colors in their overlapping positions. When the lens system disclosed herein is used in this type of color copier at 1X magnification and an aperture of substantially $f(5.6)$ secondary color effects are reduced, especially in the higher wavelengths, when the values set out in table V and chart II are maintained.

TABLE V $F(I, II) = F(V, VI) = -1.624F$
$F(III) = F(IV) = 1.134F$
$S_2 = S_5 = .020F$
$S_3 = S_4 = .022F$
$T_1 = T_6 = .067F$
$T_2 = T_5 = .041F$
$T_3 = T_4 = .032F$
$R_1 = -R_{10} = .276F$
$-R_2 = R_9 = 2.077F$
$R_3 = -R_8 = .195F$
$R_4 = -R_7 = .271F$
$R_5 = -R_6 = .412F$
$N_d(I) = N_d(VI) = 1.638$
$N_d(II) = N_d(V) = 1.567$
$N_d(III) = N_d(IV) = 1.643$
$v(I) = v(VI) = 55.5$
$v(II) = v(V) = 42.8$
$v(III) = v(IV) = 47.8$ and wherein the diameter opening at:
$f(4.5) = .176F$
$f(5.6) = .142F$
$f(6.3) = .126F$
$f(8.0) = .099F$

CHART II

[E.F.L.=8.206"  B.F.L.=6.519"  f(5.6)]

| Lens | Focal length | Radii | Thickness | Spaces | $N_d$ | $v$ |
|---|---|---|---|---|---|---|
| I | $F(I, IV)=3.175$ | $R_1=2.269$ | $T_1=.553$ | | 1.638 | 55.5 |
| II | | $-R_2=17.046$ | $T_2=.333$ | | 1.567 | 42.8 |
| | | $R_3=1.6$ | | $S_2=.165$ | | |
| III | $F(II, V)=2.564$ | $R_4=2.225$ | $T_3=.259$ | | 1.643 | 47.8 |
| | | $R_5=3.381$ | | $S_3=.185$ | | |
| | | | | $S_4=.185$ | | |
| IV | $F(III, IV)=9.303$ | $-R_6=3.381$ | $T_4=.259$ | | 1.643 | 47.8 |
| | | $-R_7=2.225$ | | $S_5=.165$ | | |
| V | | $-R_8=1.6$ | $T_5=.333$ | | 1.567 | 42.8 |
| VI | | $R_9=17.046$ | $T_6=.553$ | | 1.638 | 55.5 |
| | | $-R_{10}=2.269$ | | | | |

NOTE: All scalar values are given in inches.

In many prior art color copiers, the correction of secondary color is particularly important. An example is a copier wherein the various colors are laid down sequentially on top of Another example of specific values for the above described optical system is set out in table VI and chart III below. These values have been found to be advantageous to achieve a high degree of resolution at 1X magnification in a copier where secondary color effects are of less importance. The values in table VI and chart III are used for 1X magnification and an aperture of substantially $f(5.6)$.

TABLE VI

| | |
|---|---|
| $F(I, II) = F(V, VI)$ | $= -1.765$ |
| $F(III) = F(IV)$ | $= 1.188F$ |
| $S_2 = S_5$ | $= .023F$ |
| $S_3 = S_4$ | $= .035F$ |
| $T_1 = T_6$ | $= .055F$ |
| $T_2 = T_5$ | $= .053F$ |
| $T_3 = T_4$ | $= .038F$ |
| $R_1 = -R_{10}$ | $= .257F$ |
| $-R_2 = R_9$ | $= 1.657F$ |
| $R_3 = -R_8$ | $= .188F$ |
| $R_4 = -R_7$ | $= .293F$ |
| $R_5 = -R_6$ | $= .453F$ |
| $N_d(I) = N_d(VI)$ | $= 1.638$ |
| $N_d(II) = N_d(V)$ | $= 1.573$ |
| $N_d(III) = N_d(IV)$ | $= 1.643$ |
| $v(I) = v(VI)$ | $= 55.5$ |
| $v(II) = v(V)$ | $= 42.7$ |
| $v(III) = v(IV)$ | $= 47.8$ | and wherein the diameter opening at $f(5.6) = .137F$.

CHART III

[E.F.L. = 13.637  B.F.L. = 13.751  $f(5.6)$]

| Lens | Focal length | Radii | Thickness | Spaces | $N_d$ | $v$ |
|---|---|---|---|---|---|---|
| I | $F(I, IV) = 5.491$ | $R_1 = 3.503$ | $T_1 = .754$ | | 1.638 | 55.5 |
| II | | $-R_2 = \infty$ | $T_2 = .724$ | | 1.573 | 42.7 |
| | | $R_3 = 2.562$ | | $S_2 = .321$ | | |
| III | $F(II, V) = -4.471$ | $R_4 = 4.003$ | $T_3 = .516$ | | 1.643 | 47.8 |
| | | $R_5 = 6.172$ | | $S_3 = .477$ | | |
| | | | | $S_4 = .477$ | | |
| IV | $F(III, IV) = 16.206$ | $-R_6 = 6.172$ | $T_4 = .516$ | | 1.643 | 47.8 |
| | | $-R_7 = 4.003$ | | $S_5 = .321$ | | |
| V | | $-R_8 = 2.562$ | $T_5 = .724$ | | 1.573 | 42.7 |
| VI | | $R_9 = \infty$ | $T_6 = .754$ | | 1.638 | 55.5 |
| | | $-R_{10} = 3.503$ | | | | |

NOTE: All scalar values are given in inches.

Although only certain preferred forms of the invention have been shown and described in detail, other forms which are different in precise detail are possible and the values of the optical parameters may be varied within the above-stated limits without departing from the spirit of the invention as defined in the claims appended hereto.

What I claim is:

1. A symmetrical Split Dagor type of copying lens system having an aperture of substantially $f(4.5)$ and magnifying the image formed thereby between 1X and 1.6X, said lens system being corrected for spherical aberration and chromatic aberration including secondary color, lateral and longitudinal chromatism, coma, astigmatism, distortion and field curvature, comprising:
   a. a front compound component including lens elements I, II, and III between the optical plane and diaphragm,
   b. a back compound component including lens elements IV, V, and VI between the diaphragm and image plane,
   c. the two outer lens elements I and VI being of equal positive power and being placed in a symmetrical manner about the diaphragm, the two inner lens elements III and IV being equal positive power and being placed adjacent to the diaphragm in a symmetrical manner about the diaphragm, and lens elements II and V being of equal negative power, lens element II being placed between lens elements I and III and cemented to lens element I and lens element V being placed between lens elements IV and VI and cemented to lens element VI,
   d. the front compound component having a focal length between 1.530F and 1.545F and the back component having a focal length between 1.530F and 1.545F, while F represents the equivalent focal length of the lens system, and
   e. the constructional data relating to the lens system having comprehensive values is given in the table herebelow wherein $S_2$ designates the air space between lens element II and III, $S_3$ designates the air space between lens element III and the diaphragm, $S_4$ designates the air space between the diaphragm and lens element IV, and $S_5$ designates the air space between lens elements IV and V, $T_1$ to $T_6$ designate the axial thickness of successive lens elements I to VI, $R_1$ to $R_{10}$ designate radii of the successive lens surfaces numbering from the first radii in the front component of the lens, the minus (−) sign used with certain R values to define that the surfaces are concave towards incident light, and the refractive index and Abbe number of the glasses in said lens element being designated respectively $N_d$ and $v$:

| | |
|---|---|
| $F(I, II) = F(V, VI)$ | $= -9.812F$ |
| $F(III) = F(IV)$ | $= 1.1448F$ |
| $S_2 = S_5$ | $= .0221F$ |
| $S_3 = S_4$ | $= .0216F$ |
| $T_1 = T_6$ | $= .0716F$ |
| $T_2 = T_5$ | $= .0336F$ |
| $T_3 = T_4$ | $= .0376F$ |
| $R_1 = -R_{10}$ | $= .2646F$ |
| $-R_2 = R_9$ | $= 1.6577F$ |
| $R_3 = -R_8$ | $= .1894F$ |
| $R_4 = -R_7$ | $= .2735F$ |
| $R_5 = -R_6$ | $= .411F$ |
| $N_d(I) = N_d(VI)$ | $= 1.638$ |
| $N_d(II) = N_d(V)$ | $= 1.573$ |
| $N_d(III) = N_d(IV)$ | $= 1.643$ |
| $v(I) = v(VI)$ | $= 55.5$ |
| $v(II) = v(V)$ | $= 42.7$ |
| $v(III) = v(IV)$ | $= 47.8$ | and wherein the diameter opening at:
$f(4.5) = .186F$
$f(5.6) = .151F$
$f(8.0) = .105F$
$f(11.0) = .007F$ 2. A symmetrical Split Dagor type of copying lens system having an aperture of substantially $f(4.5)$ and magnifying the image formed thereby between 1X and 1.6X, said lens system being corrected for spherical aberration and chromatic aberration including secondary color, lateral and longitudinal chromatism, coma, astigmatism, distortion and field curvature, comprising:
   a. a front compound component including lens elements I, II, and III between the object plane and diaphragm,
   b. a back compound component including lens elements IV, V and VI between the diaphragm and image plane, c. the two outer lens elements I and VI being of equal positive power and being placed in a symmetrical manner about the diaphragm, the two inner lens elements III and IV being equal positive power and being placed adjacent the diaphragm in a symmetrical manner about the diaphragm, and lens elements II and V being of equal negative power, lens element II being placed between lens elements I and III and cemented to lens element I and lens element V being placed between lens element IV and VI and cemented to lens element VI, d. the numerical values for the constructional data of the lens system being given in the chart herebelow wherein $R_1$ to $R_{10}$ represent the radii of curvatures of successive lens surfaces, and the minus (−) sign used therewith signifies the radius of the designated surface has its center of curvature located on the entrance side of the lens system with respect to the vertex of said surface (see table above)

```
.0219F    <S₂         <.0223F
.0210F    <S₃         <.0226F
.0210F    <S₄         <.0226F
.0219F    <S₅         <.0223F
.0711F    <T₁         <.0721F
.0330F    <T₂         <.0342F
.0370F    <T₃         <.0381F
.0370F    <T₄         <.0381F
.0330F    <T₅         <.0342F
.0711F    <T₆         <.0721F
1.636     <Nd (I)     <1.640
1.565     <Nd (II)    <1.575
1.641     <Nd (III)   <1.645
1.641     <Nd (IV)    <1.645
1.562     <Nd (V)     <1.575
1.636     <Nd (VI)    <1.640
54.7      <v (I)      <57.7
41.6      <v (II)     <45.0
46.9      <v (III)    <50.0
46.9      <v (IV)     <50.0
41.6      <v (V)      <45.0
54.7      <v (VI)     <57.7
.2380F    <R₁=−R₁₀    <.2770F
1.5500F   <−R₂=R₉     <1.7100F
.1810F    <R₃=−R₈     <.1930F
.2680F    <R₄=−R₇     <.2910F
.4040F    <R₅=−R₆     <.4180F
``` wherein $N_d$ and $v$ are absolute values for the refractive index and Abbe number of the glass, respectively, from which the lens elements are made.

3. The lens system according to claim 2 wherein the lens elements have the following characteristics:

[E.F.L.=10.0"  B.F.L.=8.234"  f(4.5)]

| Lens | Focal length | Radii | Thickness | Spaces | $N_d$ | $v$ |
|------|--------------|-------|-----------|--------|-------|------|
| I    | F(I, IV)=3.629 | $R_1$=2.646 | $T_1$=.717 |  | 1.638 | 55.5 |
| II   |              | −$R_2$=16.577 | $T_2$=.337 |  | 1.573 | 42.7 |
|      |              | $R_3$=1.894 |           | $S_2$=.221 |     |     |
| III  | F(II, V)=2.946 | $R_4$=2.736 | $T_3$=.376 |  | 1.643 | 47.8 |
|      |              | $R_5$=4.119 |           | $S_3$=.217 |     |     |
|      |              |             |           | $S_4$=.217 |     |     |
| IV   | F(III, IV)=11.448 | −$R_6$=4.119 | $T_4$=.376 |  | 1.643 | 47.8 |
|      |              | −$R_7$=2.736 |           | $S_5$=.221 |     |     |
|      |              | −$R_8$=1.894 |           |        |     |     |
| V    |              | $R_9$=16.577 | $T_5$=.337 |  | 1.573 | 42.7 |
| VI   |              | −$R_{10}$=2.646 | $T_6$=.717 |  | 1.638 | 55.5 | and wherein all scalar values are given in inches.

4. The lens system according to claim 2 wherein the lens elements have the following characteristics:

[E.F.L.=8.206  B.F.L.=6.519  f(5.6)]

| Lens | Focal length | Radii | Thickness | Spaces | $N_d$ | $v$ |
|------|--------------|-------|-----------|--------|-------|------|
| I    | F(I, VI)=3.175 | $R_1$=2.269 | $T_1$=.553 |  | 1.638 | 55.5 |
| II   |              | −$R_2$=17.046 | $T_2$=.333 |  | 1.567 | 42.8 |
|      |              | $R_3$=1.6 |           | $S_2$=.165 |     |     |
| III  | F(II, V)=2.564 | $R_4$=2.225 | $T_3$=.259 |  | 1.643 | 47.8 |
|      |              | $R_5$=3.381 |           | $S_3$=.185 |     |     |
|      |              |             |           | $S_4$=.185 |     |     |
| IV   | F(III, IV)=9.303 | −$R_6$=3.381 | $T_4$=.259 |  | 1.643 | 47.8 |
|      |              | −$R_7$=2.225 |           | $S_5$=.165 |     |     |
|      |              | −$R_8$=1.6 |           |        |     |     |
| V    |              | $R_9$=17.046 | $T_5$=.333 |  | 1.567 | 42.8 |
| VI   |              | −$R_{10}$=2.269 | $T_6$=.553 |  | 1.638 | 55.5 | and wherein all scalar values are given in inches.

5. The lens system according to claim 2 wherein the lens elements have the following characteristics:

[E.F.L.=13.637  B.F.L.=13.751  f(5.6)]

| Lens | Focal length | Radii | Thickness | Spaces | $N_d$ | $v$ |
|------|--------------|-------|-----------|--------|-------|------|
| I    | F(I, VI)=5.491 | $R_1$=3.503 | $T_1$=.754 |  | 1.638 | 55.5 |
| II   |              | −$R_2$=∞ | $T_2$=.724 |  | 1.573 | 42.7 |
|      |              | $R_3$=2.562 |           | $S_2$=.321 |     |     |
| III  | F(II, V)=4.471 | $R_4$=4.003 | $T_3$=.516 |  | 1.643 | 47.8 |
|      |              | $R_5$=6.172 |           | $S_3$=.477 |     |     |
|      |              |             |           | $S_4$=.477 |     |     |
| IV   | F(III, IV)=16.206 | −$R_6$=6.172 | $T_4$=.516 |  | 1.643 | 47.8 |
|      |              | −$R_7$=4.003 |           | $S_5$=.321 |     |     |
|      |              | −$R_8$=2.562 |           |        |     |     |
| V    |              | $R_9$=∞ | $T_5$=.724 |  | 1.573 | 42.7 |
| VI   |              | −$R_{10}$=3.503 | $T_6$=.754 |  | 1.638 | 55.5 | and wherein all scalar values are given in inches.

6. A symmetrical Split Dagor type of copying lens system having an aperture of substantially $f(5.6)$ and magnifying the image formed thereby 1X, said lens system being corrected for spherical aberration and chromatic aberration including secondary color, lateral and longitudinal chromatism, coma, astigmatism, distortion and field curvature, comprising:
a. a front compound component including lens elements I, II, and III between the optical plane and diaphragm,
b. a back compound component including lens elements IV, V, and VI between the diaphragm and image plane,
c. the two outer lens elements I and VI being of equal positive power and being placed in a symmetrical manner about the diaphragm, the two inner lens elements III and IV being equal positive power and being placed adjacent to the diaphragm in a symmetrical manner about the diaphragm, and lens elements II and V being of equal negative power, lens element II being placed between lens elements I and III and cemented to lens element I and lens element V being placed between lens elements IV and VI and cemented to lens element VI, and
d. the constructional data relating to the lens system having comprehensive values is given in the table herebelow wherein $S_2$ designates the air space between lens element II and III, $S_3$ designates the air space between lens element III and the diaphragm, $S_4$ designates the air space between the diaphragm and lens element IV, and $S_5$ designates the air space between lens elements IV and V, $T_1$ to $T_6$ designate the axial thickness of successive lens elements I to VI, $R_1$ to $R_{10}$ designate radii of the successive lens surfaces numbering from the first radii in the front component of the lens, the minus (—) sign used with certain R values to define that the surfaces are concave towards incident light, and the refractive index and Abbe number of the glasses in said lens element being designated respectively $N_d$ and $v$:

| | | |
|---|---|---|
| $F(I,II)$ | $=F(V,VI)$ | $=1.624F$ |
| $F(III)$ | $=F(IV)$ | $=1.134F$ |
| $S_2$ | $=S_5$ | $=.020F$ |
| $S_3$ | $=S_4$ | $=.022F$ |
| $T_1$ | $=T_6$ | $=.067F$ |
| $T_2$ | $=T_5$ | $=.041F$ |
| $T_3$ | $=T_4$ | $=.032F$ |
| $R_1$ | $=-R_{10}$ | $=.276F$ |
| $-R_2$ | $=R_9$ | $=2.077F$ |
| $R_3$ | $=-R_8$ | $=.195F$ |
| $R_4$ | $=-R_7$ | $=.271F$ |
| $R_5$ | $=-R_6$ | $=.412F$ |
| $N_d(I)$ | $=N_d(VI)$ | $=1.638$ |
| $N_d(II)$ | $=N_d(V)$ | $=1.567$ |
| $N_d(III)$ | $=N_d(IV)$ | $=1.643$ |
| $v(I)$ | $=v(VI)$ | $=55.5$ |
| $v(II)$ | $=v(V)$ | $=42.8$ |
| $v(III)$ | $=v(IV)$ | $=47.8$ | and wherein the diameter opening at:
$f(4.5)=.176F$
$f(5.6)=.142F$
$f(6.3)=.126F$
$f(8.0)=.099F$ 7. A symmetrical Split Dagor type of copying lens system having an aperture of substantially $f(5.6)$ and magnifying the image formed thereby 1X, said lens system being corrected for spherical aberration and chromatic aberration including secondary color, lateral and longitudinal chromatism, coma, astigmatism, distortion and field curvature, comprising:
a. a front compound component including lens elements I, II, and III between the optical plane and diaphragm,
b. a back compound component including lens elements IV, V, and VI between the diaphragm and image plane,
c. the two outer lens elements I and VI being of equal positive power and being placed in a symmetrical manner about the diaphragm, the two inner lens elements III and IV being equal positive power and being placed adjacent to the diaphragm in a symmetrical manner about the diaphragm, and lens elements II and V being of equal negative power, lens element II being placed between lens elements I and III and cemented to lens element I and lens element V being placed between lens elements IV and VI and cemented to lens element VI, and
d. the constructional data relating to the lens system having comprehensive values is given in the table herebelow wherein $S_2$ designates the air space between lens element II and III, $S_3$ designates the air space between lens element III and the diaphragm, $S_4$ designates the air space between the diaphragm and lens element IV, and $S_5$ designates the air space between lens elements IV and V, $T_1$ to $T_6$ designate the axial thickness of successive lens elements I to VI, $R_1$ to $R_{10}$ designate radii of the successive lens surfaces numbering from the first radii in the front component of the lens, the minus (—) sign used with certain R values to define that the surfaces are concave towards incident light, and the refractive index and Abbe number of the glasses in said lens element being designated respectively $N_d$ and $v$:

| | | |
|---|---|---|
| $F(I,II)$ | $=F(V,VI)$ | $=-1.765$ |
| $F(III)$ | $=F(IV)$ | $=1.188F$ |
| $S_2$ | $=S_5$ | $=.023F$ |
| $S_3$ | $=S_4$ | $=.035F$ |
| $T_1$ | $=T_6$ | $=.055F$ |
| $T_2$ | $=T_5$ | $=.053F$ |
| $T_3$ | $=T_4$ | $=.038F$ |
| $R_1$ | $=-R_{10}$ | $=.257F$ |
| $-R_2$ | $=R_9$ | $=-1.657F$ |
| $R_3$ | $=-R_8$ | $=.188F$ |
| $R_4$ | $=-R_7$ | $=.293F$ |
| $R_5$ | $=-R_6$ | $=.453F$ |
| $N_d(I)$ | $=N_d(VI)$ | $=1.638$ |
| $N_d(II)$ | $=N_d(V)$ | $=1.573$ |
| $N_d(III)$ | $=N_d(IV)$ | $=1.643$ |
| $v(I)$ | $=v(VI)$ | $=55.5$ |
| $v(II)$ | $=v(V)$ | $=42.7$ |
| $v(III)$ | $=v(IV)$ | $=47.8$ | and wherein the diameter opening at $f(5.6)=.137F$.